United States Patent [19]

Duddridge et al.

[11] Patent Number: 4,631,135
[45] Date of Patent: Dec. 23, 1986

[54] TREATING A MEDIUM

[75] Inventors: John E. Duddridge, Faringdon; Christopher A. Kent, Stoke-on-Trent, both of England

[73] Assignee: United Kingdom Atomic Energy Authority, London, England

[21] Appl. No.: 721,420

[22] Filed: Apr. 9, 1985

[51] Int. Cl.$^4$ ............................................. B01D 37/00
[52] U.S. Cl. ..................................... 210/764; 210/765; 210/807; 435/261; 165/119; 165/134.1; 261/DIG. 46
[58] Field of Search ............... 210/692, 807, 181, 184, 210/617, 618, 764, 696, 700, 660, 765, 793; 435/261, 311, 803; 203/7, 41; 261/DIG. 46; 165/95, 119, 134.1

[56] References Cited

U.S. PATENT DOCUMENTS

| | | | |
|---|---|---|---|
| 3,293,174 | 12/1966 | Robjohns | 210/617 |
| 3,966,599 | 6/1976 | Burkhead | 210/151 |
| 4,086,161 | 4/1978 | Burton | 210/602 |
| 4,172,786 | 10/1979 | Humphrey et al. | 210/696 |
| 4,177,143 | 12/1979 | Myers | 210/793 |
| 4,259,269 | 3/1981 | Flowers | 261/DIG. 46 |
| 4,276,180 | 6/1981 | Matson | 210/696 |
| 4,303,533 | 12/1981 | Freemont | 210/791 |
| 4,328,105 | 5/1982 | Arbuckle | 210/807 |
| 4,469,600 | 9/1984 | Frydman et al. | 210/617 |

FOREIGN PATENT DOCUMENTS

| | | | |
|---|---|---|---|
| 49-55563 | 5/1974 | Japan | 203/7 |
| 52-39852 | 3/1977 | Japan | 165/119 |
| 1262625 | 2/1972 | United Kingdom . | |
| A2032904 | 5/1980 | United Kingdom . | |
| A2068354 | 8/1981 | United Kingdom . | |

Primary Examiner—Benoît Castel
Attorney, Agent, or Firm—Larson and Taylor

[57] ABSTRACT

The present invention relates to treating a medium and more particularly to treating a medium to reduce or inhibit biofouling.

The invention provides a method for the reduction or inhibition of biofouling of a part of a system which is subject to contact with a medium capable of causing biofouling by providing biological material. The method comprises contacting the medium with a support material (which is preferably a high surface area material) so as to cause biological material to form on the support material in preference to the part of the system.

The invention may be applied, for example, to inhibit or reduce biofouling of heat transfer surfaces in cooling water systems.

8 Claims, 1 Drawing Figure

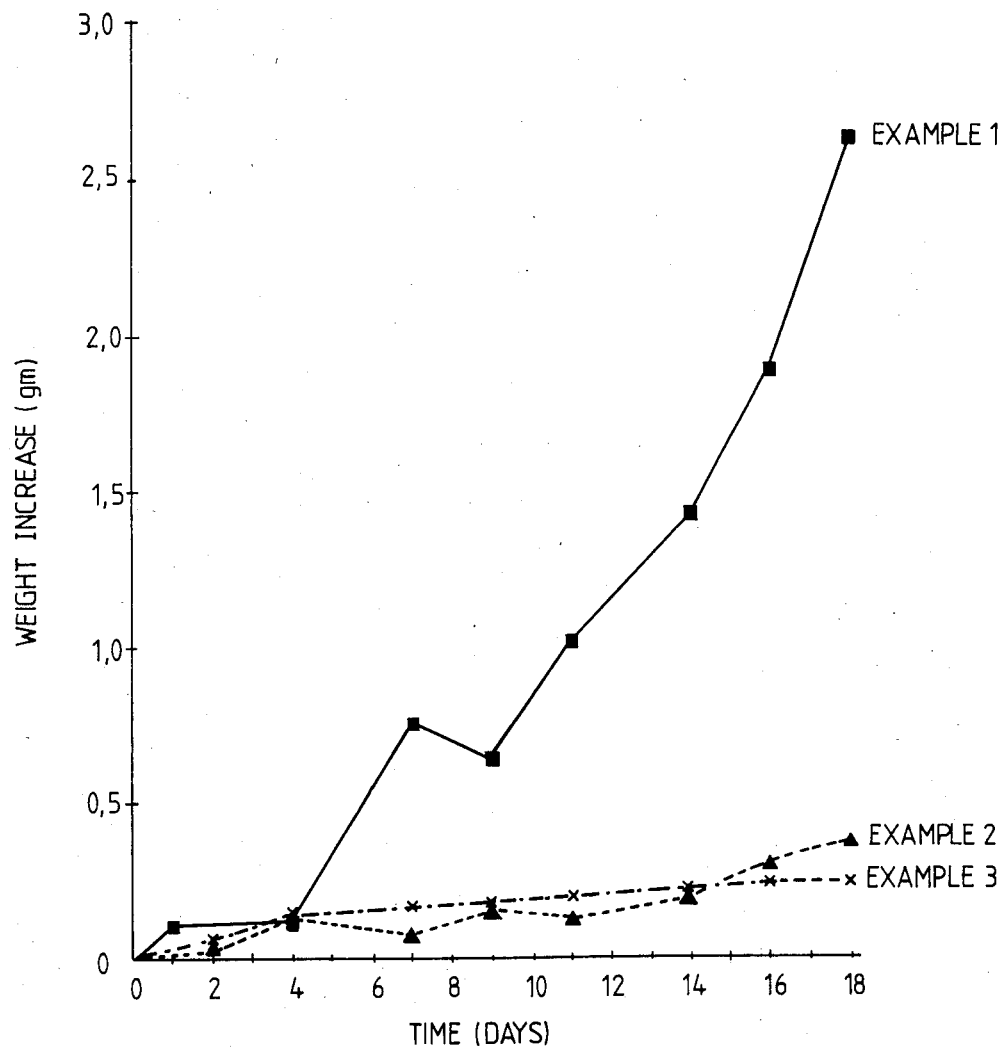

TREATING A MEDIUM

The present invention relates to treating a medium and more particularly to treating a medium to reduce or inhibit biofouling.

According to one aspect of the present invention there is provided a method for the reduction or inhibition of biofouling of a part of a system which is subject to contact with a medium capable of causing biofouling by providing biological material which comprises contacting the medium with a support material so as to cause biological material to form on the support material in preference to the said part of the system.

The medium capable of causing biofouling by providing biological material (hereinafter referred to as "the medium" or "a medium" as is appropriate) may consist of, or contain a substance or substances capable of causing biofouling by providing biological material.

It will be appreciated that biofouling may occur as a result of biological material (e.g. cells) becoming deposited or attached to a part and growing and multiplying to give a microbial deposit or microbial slime. Thus, biofouling may involve deposition of biological material and microbial growth on a part. Examples of biological materials which may give rise to biofouling are bacteria, algae, fungi and protozoa. Biological materials such as those given immediately hereinbefore by way of example may be present as a heterogeneous mixture in a medium, the composition of which mixture may vary considerably. For example, bacteria are often found to be prominent in the absence of light, whereas algae may be found to be prominent in the presence of light.

It will be appreciated that the said part of the system may be one subject to continuous or intermittent contact with the medium.

The present invention may be applied, for example, to the reduction or inhibition of biofouling of heat transfer surfaces (e.g. heat exchanger tubes) in a cooling water system (e.g. an open evaporative recirculation system or a once through system).

Thus, in one embodiment the present invention provides a method for the reduction or inhibition of biofouling of a heat exchange surface which is subject to contact with an aqueous medium capable of causing biofouling by providing biological material which comprises contacting the aqueous medium with a support material so as to cause biological material to form on the support material in preference to the said heat exchange surface.

The aqueous medium may be, for example, water containing a substance or substances which can give rise to biofouling by providing biological material. Thus, for example, the aqueous medium may be river water or water from a recirculating pond system.

The support material is preferably a high surface area support material. A high surface area support material may conveniently have, for example, a surface area/volume ratio of $>100$ cm$^2$/cm$^3$. By way of example, the support material may have a surface area/volume ratio of 500 cm$^2$/cm$^3$.

It is preferred that a high surface area material for use in accordance with the present invention should be substantially non-toxic, substantially insoluble in the medium, and substantially non-biodegradable, and should have a high porosity, a high void volume to total volume ratio, interconnecting interstices, and have a high permeability to any nutrients present in the medium.

A high surface area material for use in accordance with the present invention is also preferably compressible so that it can be compressed to express biological material and thereby render the high surface area material suitable for re-use.

The support material may be a high surface area material comprising, for example, a high surface area synthetic plastic foam (e.g. small blocks of reticulated plastic foam used as "support elements" in the "Captor" (Trade Mark) water treatment system marketed by Simon-Hartley Ltd.).

Once biological material has formed and microbial growth is established on the support material this also tends to reduce or inhibit biofouling by reducing the level of nutrients in the system since the microbial growth of the biological material on the support material uses up nutrients in metabolic activities.

It will be appreciated that nutrients may include for example organic and inorganic compounds containing carbon, nitrogen, phosphorus or sulphur. It will also be appreciated that "micronutrients" (inorganic ions e.g. copper, zinc and cobalt) may also be metabolised by the biological material and thus the concentration thereof in the system reduced.

In one embodiment of the invention, in a once-through system, medium capable of causing biofouling may be contacted with the support material prior to contacting the said part of the system.

In another embodiment in a recirculating system, a portion of the medium may be by-passed from the system, contacted with the support material and subsequently returned to the system.

According to another aspect the present invention provides a system having a part which, in use, is subject to contact with a medium capable of causing biofouling by providing biological material, and means for contacting medium with a support material so as to cause, in use, biological material to form on the support material in preference to the said part of the system.

The support material may be contained, for example, as a bed in a column through which medium may be passed.

The present invention will now be further described, by way of example only, with reference to Examples 1, 2 and 3 (in which Example 1 is a comparative example not in accordance with the present invention) and with reference to the single FIGURE of the accompanying drawing which shows results obtained in the Examples 1, 2 and 3.

EXAMPLE 1

Biofouling (microbial slime formation) in a test section of stainless steel tube (1.5 cm (ID)) was studied, in terms of weight gain of the test section, by passing river water supplemented with glucose to a concentration of 0.26 mg l$^{-1}$ through the test section at ~1.0 m s$^{-1}$ at 25° C.

The weight gain (gm) of the test section plotted against time (in days) is shown by the line designated "Example 1" in the FIGURE.

It will be appreciated that the weight gain in this Example (and in Examples 2 and 3) is a measure of the amount of biological material present in the tube and hence a measure of the extent to which biofouling has occurred.

EXAMPLE 2

The procedure of Example 1 was repeated with the exception that before passing through the stainless steel tube test section the river water supplemented with glucose was passed through a bed (~12.5 1 volume) of small blocks of reticulated plastic foam (of the type used as "support elements in the "Captor" (Trade Mark) water treatment system marketed by Simon-Hartley Ltd.).

The weight gain (gm) of the test section plotted against time (days) is shown by the line designated "Example 2" in the FIGURE.

On comparing the results of Example 1 (where no high surface area support material was used) and Example 2 (where a high surface area support material was used) it can be seen that when the river water supplemented with glucose is contacted with a high surface area support material prior to passing through the test section the extent of biofouling is reduced by a factor of 6 to 7.

EXAMPLE 3

The procedure of Example 2 was repeated with the exception that the small blocks of reticulated plastic foam were not "fresh" at the beginning of the weight gain observations since they had been previously used for 3 weeks as in Example 2 and thus carried microbial material at the beginning of the weight gain observations.

The weight gain (gm) of the test section plotted against time (days) is shown by the line designated "Example 3" in the FIGURE.

On comparing the results of Example 1 (where no high surface area support material was used) and Example 3 (where high surface area support material already carrying microbial material was used) it can be seen that when the river water supplemented with glucose is contacted with a high surface area support material (which material is already carrying microbial material) prior to passing through the test section the extent of biofouling is also reduced by a factor of 6 to 7.

We claim:

1. A method for the reduction or inhibition of biofouling of a part of a system which is subject to contact with a medium capable of causing biofouling by providing biological material which comprises contacting the medium with a support material so as to cause biological material to form on the support material in preference to the said part of the system.

2. A method as claimed in claim 1 for the reduction or inhibition of biofouling of a heat exchange surface which is subject to contact with an aqueous medium capable of causing biofouling by providing biological material which comprises contacting the aqueous medium with a support material so as to cause biological material to form on the support material in preference to the said heat exchange surface.

3. A method as claimed in claim 2 wherein the aqueous medium is river water or water from a recirculating pond system.

4. A method as claimed in claim 1 wherein the support material has a surface area/volume ratio of $>100$ $cm^2 cm^{-2}$.

5. A method as claimed in claim 4 wherein the support material has a surface area/volume ratio of $>500$ $cm^2 cm^{-3}$.

6. A method as claimed in claims 1 wherein the support material is a synthetic plastic foam.

7. A method as claimed in claim 1 wherein a portion of the medium is by-passed from the system, contacted with the support material and subsequently returned to the system.

8. A method as claimed in claim 1 wherein the support material is a high surface area material which is compressible so that it can be compressed to express biological material and thereby render the high surface area material suitable for re-use.

* * * * *